(12) United States Patent
Kolhatkar et al.

(10) Patent No.: US 10,641,245 B2
(45) Date of Patent: May 5, 2020

(54) HYBRID POWER GENERATION SYSTEM AND AN ASSOCIATED METHOD THEREOF

(71) Applicant: General Electric Company, Schenectady, NY (US)

(72) Inventors: Yashomani Y Kolhatkar, Bangalore (IN); Govardhan Ganireddy, Roanoke, VA (US); Ravisekhar Nadimpalli Raju, Clifton Park, NY (US); Rajni Kant Burra, Clifton Park, NY (US); Arvind Kumar Tiwari, Bangalore (IN); John Leo Bollenbecker, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/663,603

(22) Filed: Jul. 28, 2017

(65) Prior Publication Data

US 2018/0187653 A1    Jul. 5, 2018

Related U.S. Application Data

(63) Continuation-in-part of application No. 15/399,049, filed on Jan. 5, 2017.

(51) Int. Cl.
*F03D 9/00* (2016.01)
*H02J 5/00* (2016.01)
(Continued)

(52) U.S. Cl.
CPC ............ *F03D 9/007* (2013.01); *F03D 9/255* (2017.02); *H02J 3/383* (2013.01); *H02J 3/386* (2013.01);
(Continued)

(58) Field of Classification Search
CPC .......... F03D 9/007; F03D 9/255; H02P 9/007; H02J 5/00
See application file for complete search history.

(56) References Cited

U.S. PATENT DOCUMENTS 4,041,369 A * 8/1977 King ..................... H02J 7/1461
 320/134
9,007,788 B2 * 4/2015 Lu ........................... H02J 3/386
 290/31

(Continued)

FOREIGN PATENT DOCUMENTS

CN    202374014 U    8/2012
CN    103490524 A    1/2014
(Continued)

OTHER PUBLICATIONS

Gu et al., "Medium-Voltage (MV) Matrix Converter Topology for Wind Power Conversion Using Medium Frequency Transformer (MFT) Isolation", Twenty-Ninth Annual IEEE Applied Power Electronics Conference and Exposition (APEC), Mar. 16-20, 2014; pp. 3084-3090.
(Continued)

*Primary Examiner* — Sean Gugger
(74) *Attorney, Agent, or Firm* — Dority & Manning, P.A.

(57) ABSTRACT

A hybrid power generation system is presented. The system includes a first power generation subsystem including a prime mover driving a generator including a rotor and a stator, one or more first conversion units coupled to at least one of the rotor and the stator, a first direct current (DC) link, and one or more second conversion units coupled to a corresponding one or more first conversion units via the first DC link. The system includes one or more second power generation subsystems coupled to the first power generation subsystem and one or more power conversion subunits including one or more first bridge circuits coupled to a (Continued)

corresponding one or more second bridge circuits via one or more transformers, where at least one of the one or more second power generation subsystems and the first power generation subsystem includes the one or more power conversion subunits.

16 Claims, 5 Drawing Sheets

(51) Int. Cl.
*F03D 9/25* (2016.01)
*H02J 3/38* (2006.01)
*H02P 9/00* (2006.01)
*H02J 3/32* (2006.01)

(52) U.S. Cl.
CPC . *H02J 5/00* (2013.01); *H02J 3/32* (2013.01); *H02P 9/007* (2013.01); *Y02E 10/725* (2013.01)

(56) References Cited

U.S. PATENT DOCUMENTS

| | | | |
|---|---|---|---|
| 2002/0079706 A1 | 6/2002 | Rebsdorf et al. | |
| 2005/0225090 A1* | 10/2005 | Wobben | F03D 9/00 290/44 |
| 2006/0062034 A1* | 3/2006 | Mazumder | H02J 3/387 363/131 |
| 2006/0097519 A1* | 5/2006 | Steinke | H02J 3/36 290/44 |
| 2007/0138792 A1* | 6/2007 | Liu | H02J 4/00 290/1 A |
| 2008/0304300 A1* | 12/2008 | Raju | H02M 7/217 363/126 |
| 2010/0156185 A1* | 6/2010 | Kim | H01M 16/003 307/72 |
| 2010/0156186 A1* | 6/2010 | Kim | H01M 16/003 307/72 |
| 2010/0177452 A1* | 7/2010 | Wei | H02P 27/06 361/111 |
| 2011/0049994 A1* | 3/2011 | Hiller | H02M 7/49 307/82 |
| 2012/0170325 A1 | 7/2012 | Jin et al. | |
| 2013/0184884 A1* | 7/2013 | More | F03D 7/0284 700/291 |
| 2013/0197704 A1* | 8/2013 | Pan | H02J 3/36 700/287 |
| 2014/0091630 A1* | 4/2014 | Kim | H02J 3/36 307/82 |
| 2014/0146583 A1* | 5/2014 | Trainer | H02J 3/36 363/35 |
| 2014/0203559 A1* | 7/2014 | Wagoner | H02M 5/4585 290/44 |
| 2015/0022005 A1 | 1/2015 | Jordan | |
| 2015/0049524 A1* | 2/2015 | Wagoner | H02M 7/483 363/37 |
| 2015/0070939 A1* | 3/2015 | Gupta | H02J 3/36 363/17 |
| 2015/0263526 A1* | 9/2015 | Kjær et al. | H02J 3/386 290/44 |
| 2016/0083220 A1* | 3/2016 | Agirman | H02J 7/02 187/290 |
| 2016/0172111 A1* | 6/2016 | Jun | H01G 4/38 361/329 |
| 2016/0172992 A1* | 6/2016 | Tallam | H02M 1/36 363/37 |
| 2016/0359427 A1* | 12/2016 | Ghosh | H02M 7/217 |
| 2017/0033679 A1* | 2/2017 | Kaufman | H02M 1/32 |
| 2018/0054140 A1* | 2/2018 | Chen | H02M 7/797 |
| 2019/0319530 A1* | 10/2019 | Giuntini | H02M 1/32 |

FOREIGN PATENT DOCUMENTS

| | | | | |
|---|---|---|---|---|
| WO | 2011/033308 A2 | 3/2011 | | |
| WO | 2011033308 A2 | 3/2011 | | |
| WO | WO 2011033308 A2 * | 3/2011 | | H02J 3/36 |

OTHER PUBLICATIONS

Li et al., "Grid Connection Using a High-frequency Isolated DC/AC Module for Hybrid Power Systems", Electric Power Components and Systems, vol. 42, Issue 12, Sep. 2014.

Daniel et al., "A New Wind Turbine Interface to MVDC Grid With High Frequency Isolation and Input Current Shaping", 40th Annual Conference of the IEEE Industrial Electronics Society, IECON, Oct. 29-Nov. 1, 2014.

Mousavian et al., "A High Frequency Solution for Hybrid Renewable Energy Systems", IEEE International Telecommunications Energy Conference (INTELEC), Oct. 18-22, 2015.

International Search Report and Written Opinion issued in connection with corresponding PCT Application No. PCT/US2018/042716 dated Nov. 19, 2018.

\* cited by examiner

HYBRID POWER GENERATION SYSTEM AND AN ASSOCIATED METHOD THEREOF

CROSS-REFERENCE TO RELATED APPLICATIONS

This application is a continuation-in-part of U.S. patent application Ser. No. 15/399,049, entitled "POWER CONVERTER FOR DOUBLY FED INDUCTION GENERATOR WIND TURBINE SYSTEMS" filed on Jan. 5, 2017, the contents of which are hereby incorporated by reference.

BACKGROUND

Embodiments of the present disclosure generally relate to integration of a wind power generation subsystem and a supplementary power generation subsystem using a direct current (DC) source and in particular, to integration of the wind power generation subsystem with other power generation subsystems, such as a solar power generation subsystem, an energy storage device based power generation subsystem, or both.

Demand for renewable electrical energy is continuously increasing. In some power generation systems, a power generation subsystem based on renewable energy sources, such as solar and wind energy source, is employed along with a power generation subsystem based on a non-renewable energy source. Although renewable energy sources are widely available and environmental friendly, in some situations such sources are not reliable with respect to production of power. Reliability may be increased by using power generation subsystems based on two or more sources of renewable energy.

One such hybrid power generation system includes the wind power generation subsystem integrated to any DC source based power generation subsystem. Typically, in the hybrid power generation system only one circuit element may be grounded. Grounding more than one circuit elements of the hybrid power generation system may result in a leakage current flow in the hybrid power generation system. In such scenarios, high capacity transformers may need to be employed for isolating different portions of the hybrid power generation system which have corresponding grounded circuit elements. Use of the high capacity transformers increases the footprint and cost of the hybrid power generation system.

BRIEF DESCRIPTION

In accordance with aspects of the present specification, a hybrid power generation system is presented. The hybrid power generation system includes a first power generation subsystem. The first power generation subsystem includes a prime mover driving a generator including a rotor and a stator, one or more first conversion units coupled to at least one of the rotor and the stator, a first direct current (DC) link, and one or more second conversion units coupled to a corresponding one or more first conversion units via the first DC link. Further, the hybrid power generation system includes one or more second power generation subsystems coupled to the first power generation subsystem. Moreover, the hybrid power generation system includes one or more power conversion subunits including one or more first bridge circuits coupled to a corresponding one or more second bridge circuits via one or more transformers, where at least one of the one or more second power generation subsystems and the first power generation subsystem includes the one or more power conversion subunits.

In accordance with another aspect of the present specification, a power system is presented. The power system includes an electrical grid. Further, the power system includes a wind based power generation subsystem coupled to the electrical grid. The wind based power generation subsystem includes a wind driven doubly fed induction generator having a rotor and a stator. Further, the wind based power generation subsystem includes one or more first conversion units coupled to the rotor, a first direct current (DC) link, and one or more second conversion units coupled to a corresponding one or more first conversion units via the first DC link. Furthermore, the power system includes one or more DC source based power generation subsystems coupled to the wind based power generation subsystem. Moreover, the power system includes one or more power conversion subunits including one or more first bridge circuits coupled to a corresponding one or more second bridge circuits via one or more transformers, where at least one of the one or more DC source based power generation subsystems and the wind based power generation subsystem includes the one or more power conversion subunits.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a hybrid power generation system and a method of hybrid power generation are presented. In accordance with aspects of the present specification, the hybrid power generation system includes a first power generation subsystem coupled to a second power generation subsystem. Advantageously, in the hybrid power generation system the first power generation subsystem and the second power generation subsystem may be selectively electrically isolated to prevent flow of leakage current in the hybrid power generation system. According to certain aspects of the present specification, coupling of a second power generation subsystem and the first power generation subsystem is achieved without using a common mode filter. It may be noted that use of the common mode filter typically increases the footprint of the hybrid power generation system.

Figure 1:
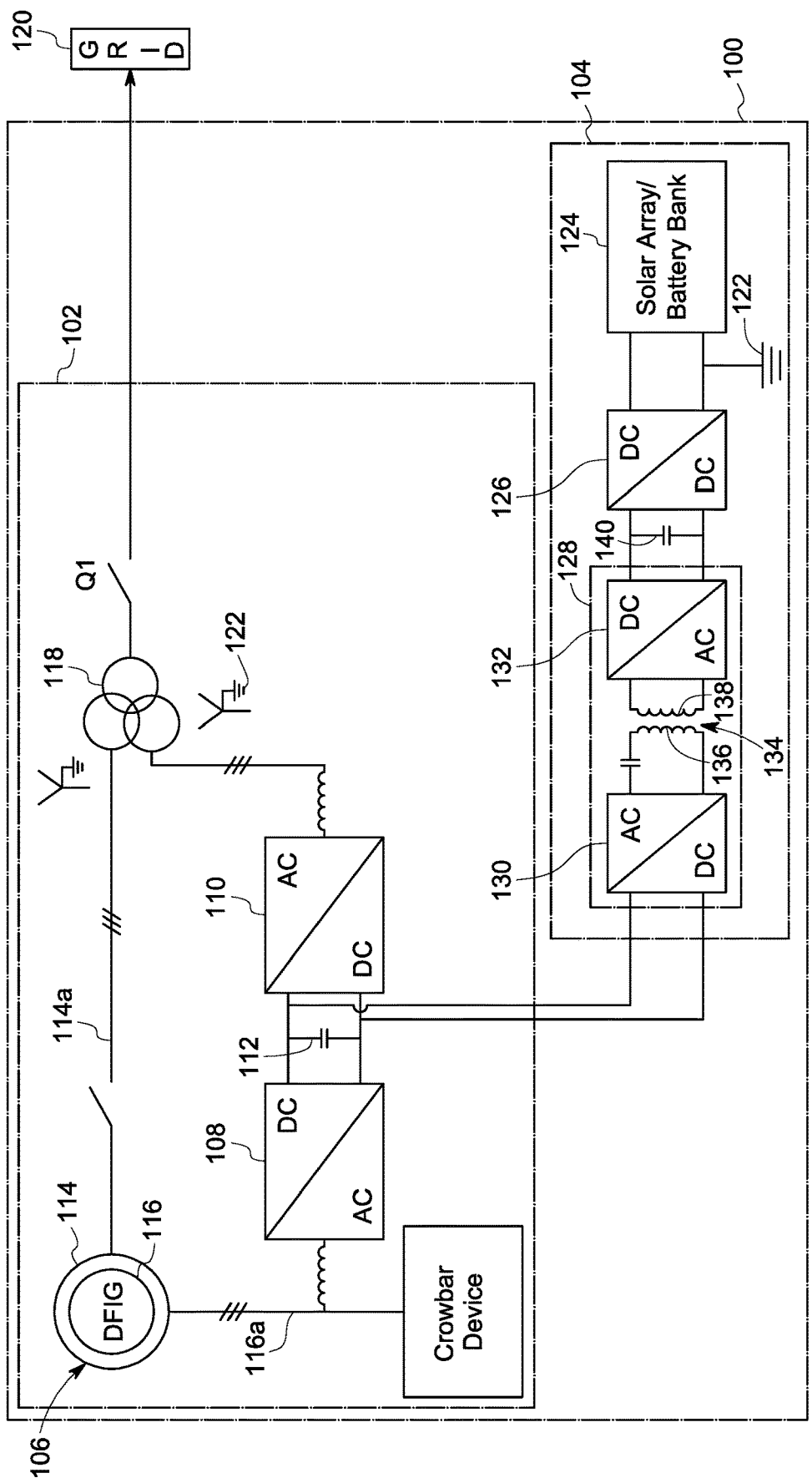
FIG. 1 is a diagrammatical representation of a hybrid power generation system, according to aspects of the present specification.

Turning now to the drawings, FIG. 1 presents a diagrammatical representation 100 of an example hybrid power generation system. The hybrid power generation system 100 includes a first power generation subsystem coupled to a second power generation subsystem. The first power generation subsystem includes a wind based power generation subsystem 102. Further, the second power generation subsystem includes a DC source based power generation subsystem 104. The DC source based power generation subsystem 104 includes a solar based power generation subsystem, an energy storage device based power generation subsystem, or any other energy source based power generation subsystem. In one embodiment, the energy storage device based power generation subsystem is a battery bank based power generation subsystem. In one embodiment, any other energy source based power generation subsystem includes a thermal based power generation subsystem, a hydroelectric based power generation subsystem, and the like.

In one embodiment, the wind based power generation subsystem 102 includes a generator 106, a first conversion unit 108, and a second conversion unit 110. The first conversion unit 108 is coupled to the second conversion unit 110 via a first DC link 112. The first conversion unit 108 may be referred to as a rotor side converter and the second conversion unit 110 may be referred to as a line side converter. The first conversion unit 108 is an alternating current (AC) to DC converter. Further, the second conversion unit 110 is a DC to AC converter. In one embodiment, the first conversion unit 108 and the second conversion unit 110 may be a bidirectional converter. In one embodiment, each of the first conversion unit 108 and the second conversion unit 110 may be single stage converters. In another embodiment, each of the first conversion unit 108 and the second conversion unit 110 may include a plurality of bridge circuits coupled in parallel.

The generator 106 may be driven by a prime mover. In one embodiment, the generator 106 is a doubly fed induction generator. Specifically, the doubly fed induction generator may be a wind driven doubly fed induction generator. The generator 106 includes a stator 114 and a rotor 116.

The first conversion unit 108 is coupled to the rotor 116. Further, the stator 114 and the second conversion unit 110 are coupled to a first transformer 118. Furthermore, the stator 114 is coupled to a grid 120 via the first transformer 118. The grid 120 may be alternatively referred to as an electrical grid. In one embodiment, the first transformer 118 is a star grounded transformer.

During operation of the hybrid power generation system 100, power generated at the generator 106 by rotating the rotor 116 is provided via a dual path to the grid 120. The dual paths are referred to as a stator bus 114a and a rotor bus 116a. A sinusoidal multiphase (e.g. three-phase) AC power is provided to the first conversion unit 108 via the rotor bus 116a. The sinusoidal multiphase AC power may be a low voltage (LV) AC power, in one embodiment. The first conversion unit 108 converts the LV AC power provided from the rotor bus 116a into DC power and provides the DC power to the DC link 112. The DC power provided to the DC link 112 may be a LV DC power.

Moreover, the second conversion unit 110 converts the LV DC power on the DC link 112 into a low voltage (LV) AC power suitable for the grid 120. Also, the stator 114 is configured to provide a MV AC power on a stator bus 114a of the wind based power generation subsystem 102. The MV AC power from the second conversion unit 110 is combined with the MV AC power from the stator 114 of the generator 106 and multiphase MV power having a frequency (e.g. 50 Hz/60 Hz) is provided to the grid 120.

Furthermore, the DC source based power generation subsystem 104 is coupled to the wind based power generation subsystem 102 at the DC link 112. The DC source based power generation subsystem 104 includes a solar array/battery bank 124, a DC to DC converter 126, and a power conversion subunit 128. Instead of a battery bank 124 use of any other energy storage device is anticipated. It should be noted herein that the terms "solar array" and "battery bank," may be used interchangeably for the reference numeral 124. The term "solar array," as used herein, refers to a combination of a plurality of photovoltaic modules. In one example, the solar array may be a solar panel. Also, the term "battery bank," as used herein, refers to a combination of a plurality of battery modules or batteries. The present specification describes a DC source based power generation subsystem 104 having a solar array 124 in great detail.

In one embodiment, the solar array 124 is coupled to the DC link 112 via the DC to DC converter 126 and the power conversion subunit 128. The power conversion subunit 128 includes a first bridge circuit 130 coupled to a second bridge circuit 132 via a second transformer 134. Particularly, the first bridge circuit 130 is coupled to a first winding 136 of the second transformer 134 and the second bridge circuit 132 is coupled to a second winding 138 of the second transformer 134. In one embodiment, the first winding 136 is a primary winding and the second winding 138 is a secondary winding. The second transformer 134 is an isolation transformer. The second transformer 134 may be configured to operate as a step-up transformer or a step-down transformer depending on direction of flow of power through the power conversion subunit 128. In one embodiment, the first bridge circuit 130 is a DC to AC converter and the second bridge circuit 132 is a AC to DC converter. The second bridge circuit 132 is coupled to the DC to DC converter 126 via a corresponding DC link 140.

Although in the embodiment of FIG. 1, both the first bridge circuit 130 and the second bridge circuit 132 include single converters, the first bridge circuit 130 and the second bridge circuit 132 may include multiple converters coupled in series in another embodiment. Also, depending on the type of application, instead of a single first and second bridge circuits 130, 132, use of multiple first and second bridge circuits is envisaged. Furthermore, instead of a two-winding transformer 134, use of a multiple winding transformer is envisioned.

The first conversion unit 108, the second conversion unit 110, the power conversion subunit 128, and the DC to DC converter 126 include a plurality of switches. Particularly, in one embodiment, each of the first conversion unit 108 and the second conversion unit 110 may include at least a pair of switches of the plurality of switches coupled in series with one another. In one embodiment, the first conversion unit 108, the second conversion unit 110, the power conversion subunit 128, and the DC to DC converter may be controlled, using a gate control signal provided to the corresponding switches, to provide a desired output to the grid 120.

The plurality of switches may include semiconductor switches. In one embodiment, the semiconductor switches include an insulated gate bipolar transistor, a metal oxide semiconductor field effect transistor, a field-effect transistor, an injection enhanced gate transistor, an integrated gate commutated thyristor, or the like. In another embodiment, the semiconductor switches include a gallium nitride based switch, a silicon carbide based switch, a gallium arsenide based switch, or the like.

In certain embodiments, the solar array 124 is coupled to a ground terminal 122. Particularly, a positive terminal, a negative terminal, or a mid-point terminal of the solar array 124 may be coupled to the ground terminal 122. In one embodiment, the mid-point terminal has a potential which is about half the value of the potential at the positive and the negative terminal of the solar array 124. In addition to the solar array 124, the first transformer 118 is coupled to the ground terminal 122.

In some embodiments, the power conversion subunit 128 is disposed between the solar array 124 and the wind based power generation subsystem 102. The power conversion subunit 128 aids in isolating the solar array 124 from the wind based power generation subsystem 102. Hence, though both the solar array 124 and the first transformer 118 are coupled to the ground terminal 122, any leakage current between the solar array 124 and the first transformer 118 is prevented. In one embodiment, since the power conversion subunit 128 aids in isolating the solar array 124 from the wind based power generation subsystem 102, use of a common mode filter for minimizing leakage current is prevented. Thus, the footprint and cost of the hybrid power generation system 100 is lower than that of a hybrid power generation system employing a common mode filter.

Although in this embodiment, only the first transformer 118 is shown to be coupled to the ground terminal 122, any circuit element of the wind based power generation subsystem 102 may be connected to the ground terminal 122. Further, although the hybrid power generation system 100 of FIG. 1 is a three-phase system, use of a hybrid power generation system having any number of phases is envisioned.

Figure 2:
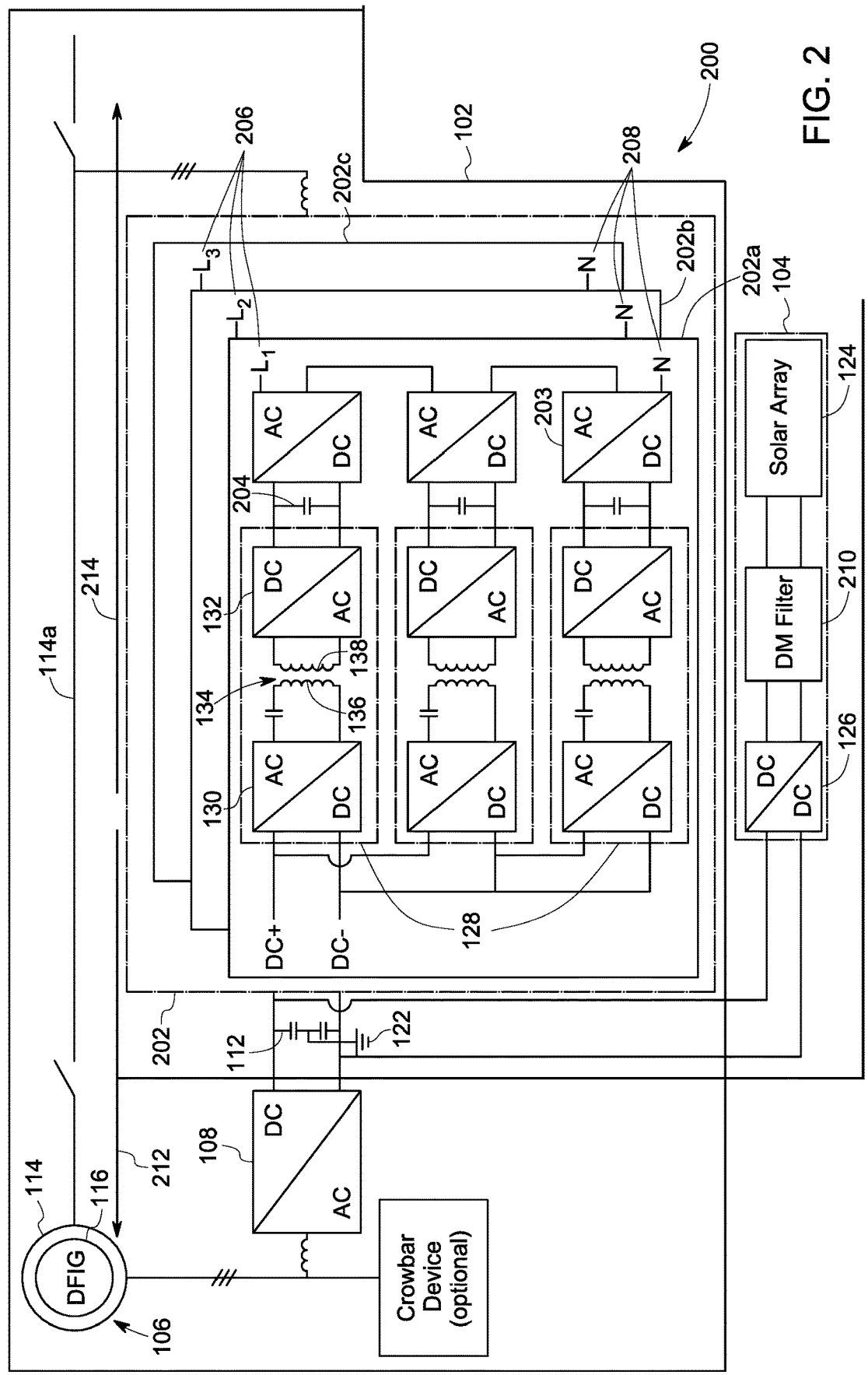
FIG. 2 is a diagrammatical representation of one embodiment of a hybrid power generation system, according to aspects of the present specification.

FIG. 2 is a diagrammatical representation 200 of one embodiment of a hybrid power generation system, according to aspects of the present specification. In particular, the embodiment of FIG. 2 represents a hybrid power generation system using modular second conversion units. Accordingly, the hybrid power generation system 200 is shown to have one or more second conversion units 202. The hybrid power generation system 200 includes a wind based power generation subsystem 102 coupled to a DC source based power generation subsystem 104. The wind based power generation subsystem 102 includes a generator 106, a first conversion unit 108 and the one or more second conversion units 202. The first conversion unit 108 and the one or more second conversion units 202 are coupled to one another via a first DC link 112.

Further, the generator 106 includes a stator 114 and a rotor 116. The first conversion unit 108 is coupled to the rotor 116. The stator 114 is coupled to the one or more second conversion unit 202 and further, the stator 114 is coupled to the grid (not shown in FIG. 2).

In one embodiment, three second conversion units 202a, 202b, 202c correspond to a respective single phase. Although the present embodiment represents three phases, it may be noted that number of phases may vary depending on the type of application. Each of the second conversion units 202a, 202b, 202c includes a plurality of power conversion subunits 128. Each of the plurality of power conversion subunits 128 includes a first bridge circuit 130 coupled to a second bridge circuit 132 via a second transformer 134. Particularly, the first bridge circuit 130 is coupled to a first winding 136 of the second transformer 134 and the second bridge circuit 132 is coupled to a second winding 138 of the second transformer 134. Additionally, the first bridge circuit 130 corresponding to each of the plurality of power conversion subunits 128 of each of the second conversion units 202a, 202b, 202c are coupled to each other and further coupled to the first DC link 112.

Further, each of the second conversion units 202a, 202b, 202c includes a plurality of second DC to AC converters 203 and a plurality of second DC links 204. In each of the second conversion units 202a, 202b, 202c, each of the power conversion subunits 128 is coupled to a corresponding second DC to AC converter 203 via a corresponding second DC link 204.

Furthermore, the plurality of second DC to AC converters 203 are coupled to each other in a series connection to form an AC phase terminal 206 and a neutral terminal 208 corresponding to each of the second conversion units 202a, 202b, 202c. Thus, each of the second conversion units 202a, 202b, 202c includes the corresponding AC phase terminal 206. Also, each of the second conversion units 202a, 202b, 202c includes the corresponding neutral terminal 208. The AC phase terminal 206 of each of the second conversion units 202a, 202b, 202c is coupled to a corresponding phase of the stator bus 114a.

The DC source based power generation subsystem 104 includes a DC to DC converter 126, a differential mode filter 210, and a solar array 124. The solar array 124 is coupled to the DC to DC converter 126 via the differential mode filter 210. Further, the DC to DC converter 126 is coupled to the first DC link 112. Accordingly, the DC source based power generation subsystem 104 is coupled to the first DC link 112.

Since each of second conversion units 202a, 202b, 202c include the plurality of power conversion subunits 128, a portion on a first winding side of the second transformer 134 is galvanically isolated from a second winding side of the second transformer 134. Thus, a first path 212 and a second path 214 of the hybrid power generation system 200 may be defined. Accordingly, a portion of the hybrid power generation system 200 along the first path 212 is isolated from a portion of the hybrid power generation system 200 along the second path 214.

In one embodiment, the first DC link 112 is a circuit element of a first path 212 and is coupled to a ground terminal 122. In addition, in one embodiment, the first transformer (not shown in FIG. 2), which is a circuit element of a second path 214 is coupled to the ground terminal 122. Since the first DC link 112 is the circuit element of the first path 212 and the first transformer is the circuit element of the second path 214, the grounded first DC link 112 is galvanically isolated from the grounded first transformer. Therefore, flow of leakage current in the hybrid power generation system 200 is prevented without using a common mode filter.

In another embodiment, instead of grounding the first DC link 112, the solar array 124 may be coupled to the ground terminal 122. In yet another embodiment, the first DC link 112 and the solar array 124 may not be grounded and accordingly, the hybrid power generation system 200 may be a floating system. In such an embodiment, the flow of leakage current may be prevented.

Figure 3:
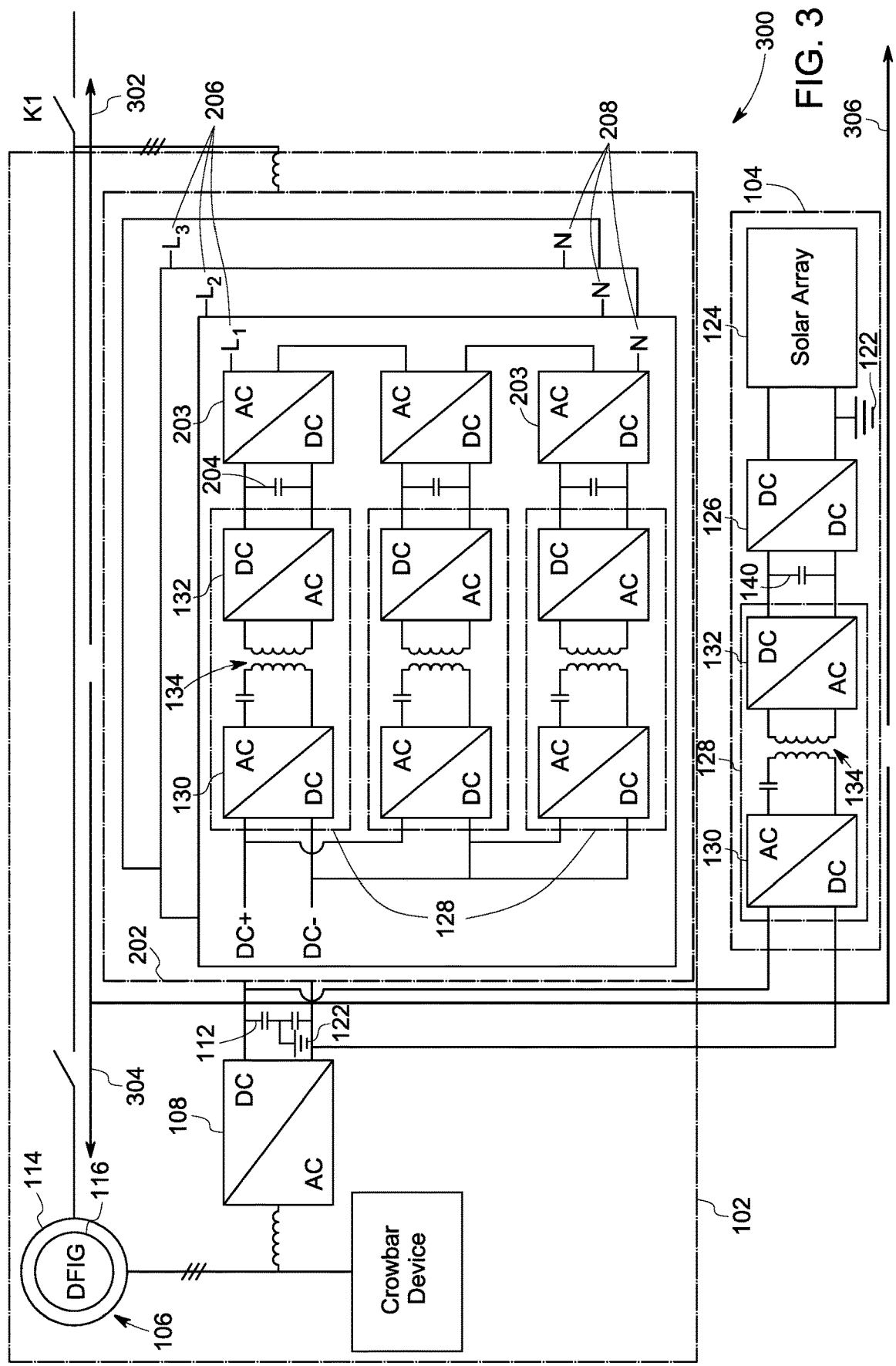
FIG. 3 is a diagrammatical representation of yet another embodiment of a hybrid power generation system, according to aspects of the present specification.

Referring now to FIG. 3, a diagrammatical representation 300 of another embodiment of a hybrid power generation system is depicted. The hybrid power generation system 300 includes a wind based power generation subsystem 102 coupled to a DC source based power generation subsystem 104 at a first DC link 112. The wind based power generation subsystem 102 includes a generator 106, a first conversion unit 108, and three second conversion units 202. The first conversion unit 108 is coupled to the three second conversion units 202 via a first DC link 112.

Each of the second conversion units 202a, 202b, 202c includes a plurality of power conversion subunits 128. Each of the plurality of power conversion subunits 128 includes a first bridge circuit 130 coupled to a second bridge circuit 132 via a second transformer 134. In each of the second conversion units 202a, 202b, 202c, each of the power conversion subunits 128 is coupled to a corresponding second DC to AC converter 203 via a corresponding second DC link 204.

The DC source based power generation subsystem 104 includes a power conversion subunit 128, a DC to DC converter 126, and a solar array 124. The solar array 124 is coupled to the first DC link 112 via the DC to DC converter 126 and the power conversion subunits 128. As previously noted, the power conversion subunit 128 includes a first bridge circuit 130 coupled to a second bridge circuit 132 via a second transformer 134.

Since each of second conversion units 202a, 202b, 202c include a power conversion subunits 128, a portion on a first winding side of the second transformer 134 is galvanically isolated from a second winding side of the second transformer 134. Similarly, since the DC source based power generation subsystem 104 includes a power conversion subunits 128, a portion on a first winding side of the second transformer 134 is galvanically isolated from a second winding side of the second transformer 134. As a result of the isolation of the first winding side from the second winding side of the second transformer 134 of each of the second conversion units 202a, 202b, 202c and the isolation of the first winding side from the second winding side of the second transformer 134 of the DC source based power generation subsystem 104, a first, second, and third paths 302, 304, 306 may be defined.

The first path 302 includes a portion from the second winding side of the second transformer 134 of each of the second conversion units 202a, 202b, 202c towards a grid side (not shown in FIG. 3). Particularly, the first path 302 includes a plurality of second DC to AC converters 203 and second bridge circuits 132 of each of the second conversion units 202a, 202b, 202c. The second path 304 includes the first bridge circuit 130 of the DC source based power generation subsystem 104, first bridge circuits 130 of each of the second conversion units 202a, 202b, 202c, the first DC link 112, and the generator 106. The third path 306 includes the second bridge circuit 132, the DC to DC converter 126, and the solar array 124 of the DC source based power generation subsystem 104.

A portion of the hybrid power generation system 300 along the first path 302 is isolated from a portion of the hybrid power generation system 300 along the second path 304 and a portion of the hybrid power generation system 300 along the third path 306. Therefore, any circuit element in the first path 302 may be grounded together with any circuit element of the second path 304 and the third path 306 to prevent flow of any leakage current. Accordingly, use of a common mode filter may not be required.

In the embodiment of FIG. 3, a mid-point of the first DC link 112 is coupled to a ground terminal 122. In addition, the solar array 124 is coupled to the ground terminal 122. Further, the first transformer (not shown in FIG. 3) may be coupled to the ground terminal. The first DC link 112, the solar array 124, and the first transformer are circuit elements corresponding to the first, second, and third paths 302, 304, 306, respectively. Accordingly flow of any leakage current and use of common mode filter to prevent flow of leakage current in the hybrid power generation system 300 is prevented.

Figure 4:
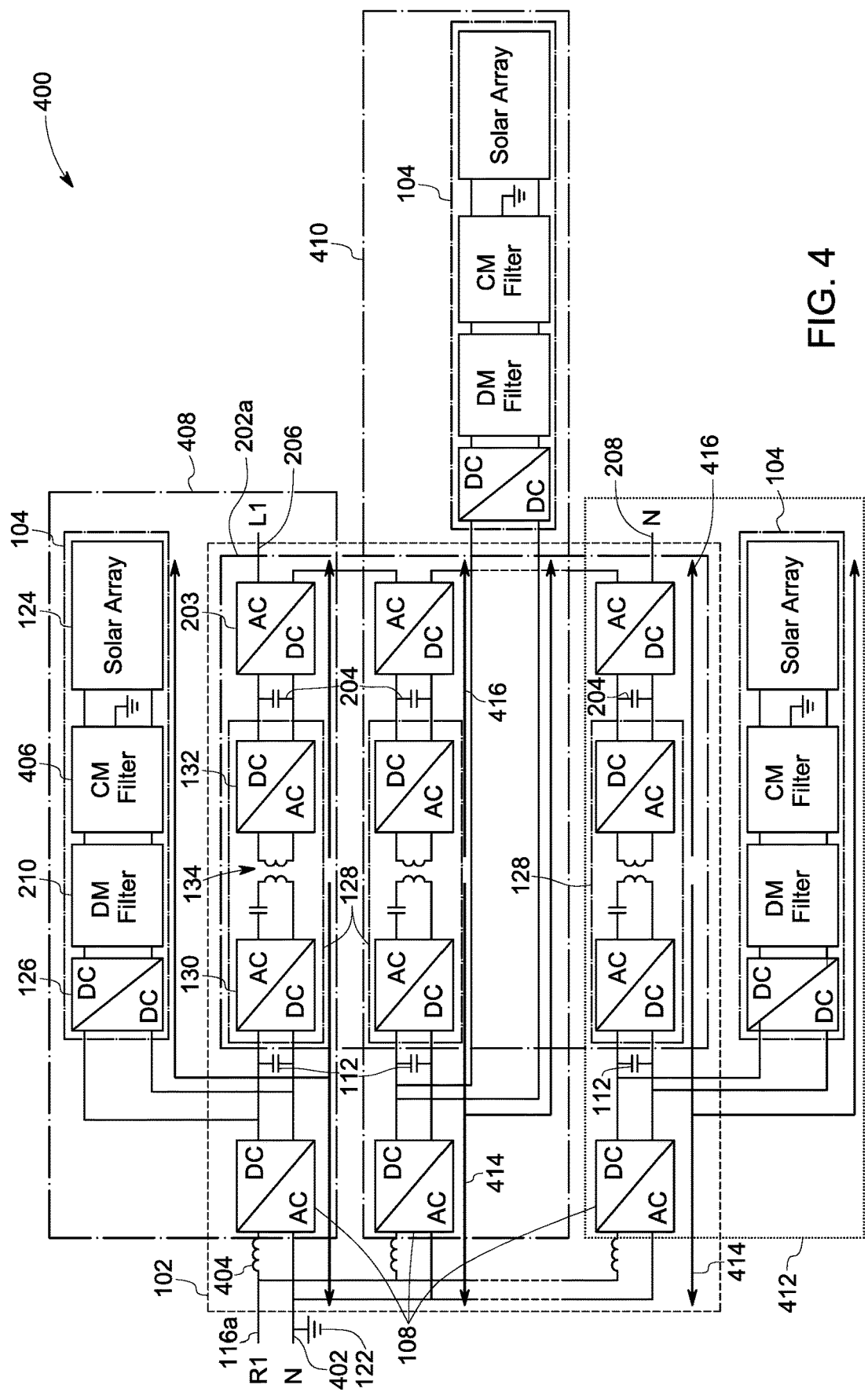
FIG. 4 is a diagrammatical representation of an embodiment of a hybrid power generation system having modular first conversion units, according to aspects of the present specification.

FIG. 4 is a diagrammatical representation 400 of an embodiment of a hybrid power generation system having modular first conversion units. Accordingly, the embodiment of FIG. 4 represents a hybrid power generation system 400 having a plurality of first conversion units 108. Particularly, FIG. 4 represents a portion of FIG. 3. Also, the embodiment of FIG. 4 represents an embodiment of a hybrid power generation system having distributed DC source based power generation subsystems. The hybrid power generation system 400 includes a wind based power generation subsystem 102 and a plurality of DC source based power generation subsystems 104.

In one embodiment, the wind based power generation subsystem 102 includes a plurality of first conversion units 108 and a second conversion unit 202a. The plurality of first conversion units 108 are coupled to one another and further coupled to the rotor 116 via a rotor bus 116a corresponding to one phase of a plurality of AC phases. In particular, each of the plurality of first conversion units 108 are coupled to the rotor (not shown in FIG. 4) via an inductor 404. Further, each of the plurality of first conversion units 108 are coupled to a neutral terminal 402.

The second conversion unit 202a includes a plurality of power conversion subunits 128 and a plurality of second DC to AC converters 203. In one embodiment, each of the first conversion unit 108 is further coupled to the corresponding power conversion subunit 128 via a corresponding first DC link 112.

Also, the second conversion unit 202a includes a plurality of second DC links 204. Each of the power conversion subunit 128 is coupled to a corresponding second DC to AC converter 203 via a second DC link 204. The plurality of second DC to AC converters 203 are coupled to each other in a series connection to form a AC phase terminal 206 and a neutral terminal 208. Thus, the second conversion unit 202a includes the AC phase terminal 206 and the neutral terminal 208.

In the embodiment of FIG. 4, each of the DC source based power generation subsystem 104 includes a solar array 124 coupled to the corresponding first DC link 112 via a corresponding DC to DC converter 126, a corresponding differential mode filter 210, and a corresponding common mode filter 406. Accordingly, a plurality of strings of power generation 408, 410, 412 may be formed. Each of the plurality of strings of power generation 408, 410, 412 include one DC source based power generation subsystem 104, a corresponding first conversion units 108, a corresponding power conversion subunit 128, and a corresponding second DC to AC converters 203.

Each of the solar array 124 includes a plurality of photovoltaic modules/battery modules. Various photovoltaic modules/battery modules employed in the hybrid power generation system 400 are distributed among the solar array/battery banks 124 corresponding to each of the plurality of DC source based power generation subsystems 104. For example, if there are 100 photovoltaic modules, the solar array 124 corresponding to each of the plurality of DC source based power generation subsystems 104 may include 25 photovoltaic modules each. Thus, the total number of photovoltaic modules is distributed among the plurality of DC source based power generation subsystems 104.

As noted hereinabove with respect to prior figures, each of the plurality of power conversion subunits 128 includes a first bridge circuit 130 coupled to a second bridge circuit 132 via a second transformer 134. Therefore, a portion on a first winding side of the second transformer 134 is galvanically isolated from a second winding side of the second transformer 134. As a result of isolation of the portion on the first winding side of the second transformer 134 from the second winding side of the second transformer 134, a first path 414 and a second path 416 for each of the strings of power generation 408, 410, 412 is defined.

The first path 414 of each of the strings of power generation 408, 410, 412 includes the first conversion unit 108, a corresponding first DC link 112, a corresponding DC source based power generation subsystems 104, and a corresponding first bridge circuit 130. In addition, the first path 414 includes the generator (not shown in FIG. 4), the rotor bus 116a. Further, the second path 416 of each of the strings of power generation 408, 410, 412 includes a second bridge circuit 132 and a second DC to AC converter 203.

A portion of the hybrid power generation system 400 along the first path 414 is isolated from a portion of the hybrid power generation system 400 along the second path 416. Therefore, for each of the strings of power generation 408, 410, 412, any circuit element in the first path 414 may be grounded together with any circuit element of the second path 416 of the corresponding string of power generation without causing a flow of leakage current. Accordingly, use of a common mode filter is avoided.

In one embodiment, the neutral terminal 402 is coupled to the ground terminal 122 and the solar array 124 is coupled to the ground terminal 122. The neutral terminal 402 and the solar array/124 both form a circuit element of the first path 414 and are therefore, not isolated from one another. Therefore, the common mode filter 406 is used in the DC source based power generation subsystem 104 to isolate the grounded neutral terminal 402 from the grounded solar array 124.

In another embodiment, if a power conversion subunit 128 is employed in each of the DC source based power generation subsystem 104, the neutral terminal 402 is galvanically isolated from the solar array 124. In this embodiment, even if both the neutral terminal 402 and the solar array 124 are grounded, the flow of leakage current is prevented. Accordingly, the use of the common mode filter 406 in each of the DC source based power generation subsystem 104 is avoided. In yet another embodiment, if the neutral terminal is not grounded and is a floating system, the use of the common mode filter 406 in each of the DC source based power generation subsystem 104 may be avoided.

Further, in yet another embodiment, each of the plurality of first conversion units 108 are coupled to both the rotor bus 116a and the neutral terminal 402 via corresponding inductors. The use of inductors aids in preventing circulating current in hybrid power generation system 400. In this embodiment, the solar array 124 may be grounded along with a grounded neutral terminal 402 without use of a common mode filter and a power conversion subunit, such as the power conversion subunit 128, in the corresponding DC source based power generation subsystems 104. Furthermore, in one embodiment, the value of inductance of the inductors may vary based on a mode of operation of the first conversion units 108. The mode of operation of the first conversion units 108 may include an interleaved mode of operation or a non-interleaved mode of operation. The term "interleaved mode of operation," as used herein, refers to a mode of operation in which carrier signals for each of the first conversion units have same frequency and amplitude, but the carrier signals are phase shifted relative to each other over a carrier signal cycle. In one example, carrier signal of one first conversion unit may be spaced apart by 360/n degrees with respect to the carrier signal of another first conversion unit, where n is the number of first conversion units.

Figure 5:
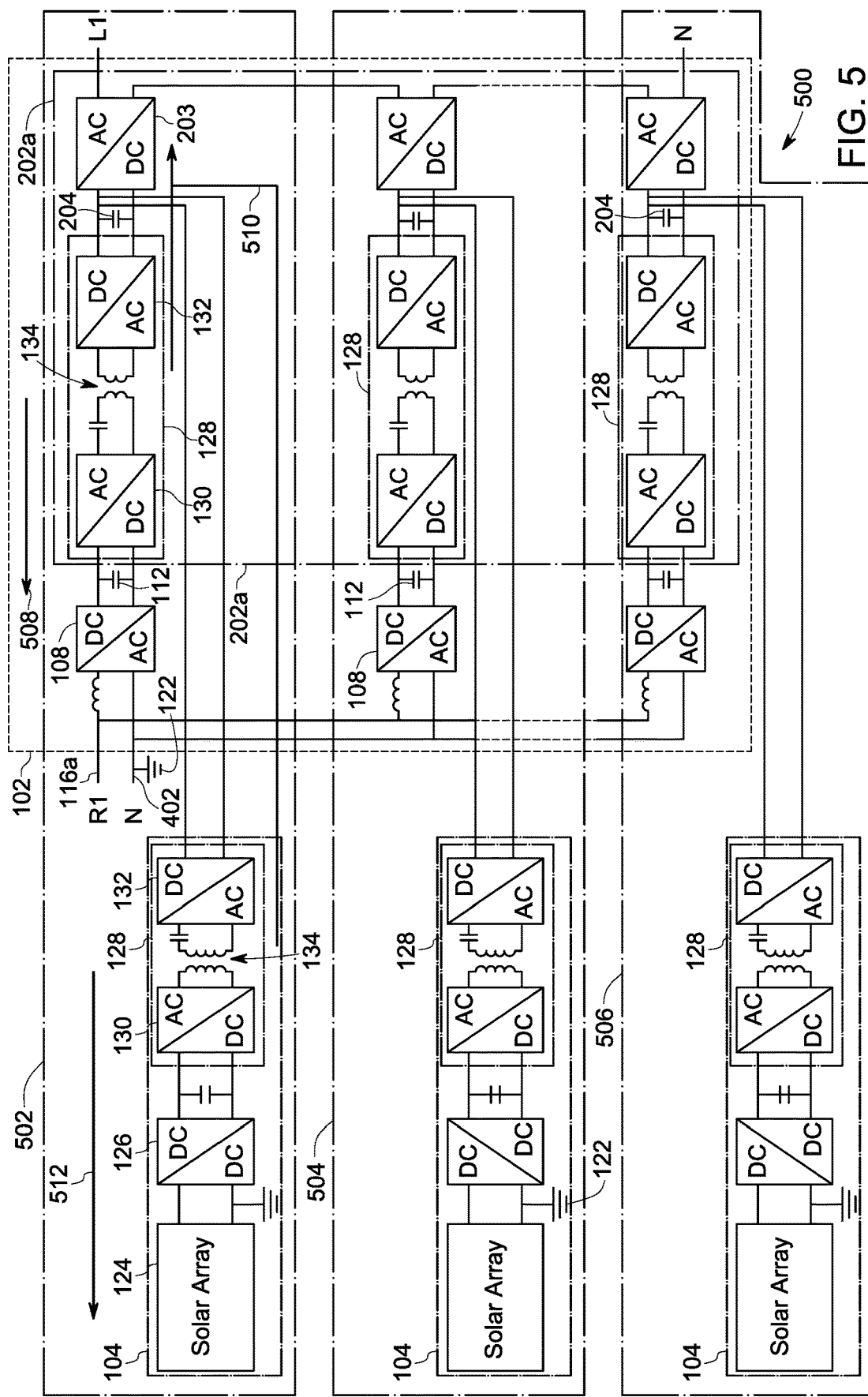
FIG. 5 is a diagrammatical representation of an embodiment of a hybrid power generation system having distributed DC source based power generation subsystems, according to aspects of the present specification.

FIG. 5 is a diagrammatical representation 500 of an embodiment of a hybrid power generation system having distributed DC source based power generation subsystems. Particularly, the hybrid power generation system 500 includes one or more DC source based power generation subsystems coupled to corresponding DC links of the one or more second conversion. More particularly, FIG. 5 is another embodiment of the hybrid power generation system 400 of FIG. 4.

The hybrid power generation system 500 includes a wind based power generation subsystem 102 and a plurality of DC source based power generation subsystems 104. In one embodiment, the wind based power generation subsystem 102 includes the plurality of first conversion units 108 and a second conversion unit 202a. The second conversion unit 202a includes a plurality of power conversion subunits 128 and a plurality of second DC to AC converters 203. Each of the first conversion units 108 is coupled to the corresponding power conversion subunit 128 of the second conversion unit 202a via a corresponding first DC link 112. Each of the plurality of power conversion subunits 128 is coupled to a corresponding second DC to AC converter 203 via a second DC link 204.

Further, each of the DC source based power generation subsystem 104 includes a solar array 124 coupled to a corresponding second DC link 204 via a corresponding DC to DC converter 126 and a corresponding power conversion subunit 128. As a result of coupling of each of the DC source based power generation subsystem 104 to the corresponding second DC links 204, a plurality of strings of power generation 502, 504, 506 may be formed. In one embodiment, each of the plurality of strings of power generation 502, 504, 506 may include a DC source based power generation subsystem 104, a corresponding first conversion unit 108, a corresponding power conversion subunit 128 of the second conversion unit 202a, and a corresponding second DC to AC converter 203 of the second conversion unit 202a.

As noted hereinabove with respect to preceding figures, each of the plurality of power conversion subunits 128 includes a first bridge circuit 130 coupled to a second bridge circuit 132 via a second transformer 134. As a result of use of the power conversion subunit 128, a portion on a first winding side of the second transformer 134 is galvanically isolated from a second winding side of the second transformer 134. Thus, a first path 508, a second path 510, and a third path 512 of the hybrid power generation system 500 may be defined. The first, second, and third paths 508, 510, and 512 are isolated from one another.

The first path 508 of each of the plurality of strings of power generation 502, 504, 506 includes one first conversion unit 108, a corresponding first DC link 112, and a corresponding first bridge circuit 130 of the second conversion unit 202*a*. The second path 510 of each of the plurality of strings of power generation 502, 504, 506 includes the second bridge circuit 132 of the second conversion unit 202*a*, a corresponding second DC to AC converter 203 and a second bridge circuit 132 of a corresponding DC source based power generation subsystem 104. The third path 512 of each of the plurality of strings of power generation 502, 504, 506 includes one solar array 124, a corresponding DC to DC converter 126, and a corresponding first bridge circuit 130 of a DC source based power generation subsystem 104.

For each of the strings of power generation 502, 504, 506, a portion of the hybrid power generation system 500 along a first path 508 is isolated from a portion of the hybrid power generation system 500 along a second path 510 and a third path 512. Therefore, for each of the strings of power generation 502, 504, 506, any circuit element in the first path 508 may be grounded together with any other circuit element of the second path 510 and the third path 512 of the corresponding string of power generation without using a common mode filter.

In one embodiment, the neutral terminal 402 is coupled to the ground terminal 122 and the solar array 124 is also coupled to the ground terminal 122. The neutral terminal 402 is a circuit element of the first path 508 and the solar array 124 is a circuit element of the third path 512 and are isolated from one another to prevent flow of a leakage current in the hybrid power generation system 500. Therefore, a common mode filter need not be employed in the hybrid power generation system 500 and particularly, in the DC source based power generation subsystems 104. Although, the examples of FIGS. 4 and 5 represent a single-phase hybrid power generation system, based on the type of application, the number of phases of the hybrid power generation system may vary.

Advantageously, according to aspects of the present specification, use of the power conversion subunit 128 aids in isolating two portions of the hybrid power generation system. For example, the DC source based power generation subsystems are isolated from the wind based power generation subsystem. Also, the use of the power conversion subunit 128 aids in preventing flow of leakage current in the hybrid power generation system. Accordingly, in embodiments, use of a common mode filter is avoided. Any power generation system which do not employ a common mode filter have a better footprint, higher reliability, and cost saving when compared to the hybrid power generation systems employing the common mode filter. Also, presence of multiple DC links in the hybrid power generation system aids in distribution of the energy sources, such as photovoltaic modules and battery modules. Distribution of the energy sources in the hybrid power generation system aids in enhanced maximum power point tracking in the case of photovoltaic modules and enhanced state of charge management in the case of battery modules.

The hybrid power generation systems of the present disclosure may find application in wind solar hybrid power generation system and any other system employing the wind based power generation subsystem. Also, the wind based power generation subsystem may be either doubly fed induction generator based or full power conversion based wind turbines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A hybrid power generation system comprising:
 a wind based power generation subsystem, wherein the wind based power generation subsystem is coupled to a ground terminal and comprises:
  a prime mover driving a doubly fed induction generator comprising a rotor and a stator;
  one or more first conversion units coupled to at least one of the rotor and the stator;
  a first direct current (DC) link;
  a plurality of second conversion units directly coupled to a corresponding one or more first conversion units via the first DC link;
 one or more DC source based power generation subsystems coupled to the first power generation subsystem via the first DC link, wherein each of the plurality of second conversion units correspond to separate alternating current phases;
 a first transformer, wherein at least the stator and the one or more second conversion units are coupled to the first transformer;
 a plurality of power conversion subunits comprising a plurality of first bridge circuits coupled to a corresponding one or more second bridge circuits via one or more corresponding transformers, wherein at least one of the one or more second power generation subsystems and the first power generation subsystem comprises the one or more power conversion subunits, and wherein the one or more power conversion subunits are configured to galvanically isolate the one or more DC source based power generation subsystems from the wind based power generation subsystem; and
 wherein each of the plurality of second conversion units comprises a plurality of the power conversion subunits and the plurality of first bridge circuits are connected in parallel on a DC side of the plurality of second conversion units.

2. The hybrid power generation system of claim 1, wherein the one or more DC source based power generation subsystem comprises at least one of one or more photovoltaic panels, one or more energy storage devices, and one or more other energy sources.

3. The hybrid power generation system of claim 1, wherein the generator comprises a wind driven doubly fed induction generator.

4. The hybrid power generation system of claim 1, wherein the one or more first bridge circuits comprise a first DC to alternating current (AC) converter and the one or more second bridge circuits comprise a first AC to DC converter.

5. The hybrid power generation system of claim 4, wherein each of the one or more second conversion units further comprises one or more second DC to AC converters coupled to one another in a series connection.

6. The hybrid power generation system of claim 5, wherein one of the one or more second DC to AC converters corresponding to each of the one or more second conversion units comprises a single AC phase terminal.

7. The hybrid power generation system of claim 6, wherein another second DC to AC converter of the one or more second DC to AC converters corresponding to each of the one or more second conversion units comprises a neutral terminal.

8. The hybrid power generation system of claim 5, wherein each of the one or more second DC to AC converters is coupled to corresponding one or more power conversion subunits via a second DC Link.

9. The hybrid power generation system of claim 8, wherein the one or more second power generation subsystems are coupled to the second DC link.

10. The hybrid power generation system of claim 4, wherein the one or more power conversion subunits corresponding to the one or more second power generation subsystems and the one or more second conversion units are coupled to the first DC link.

11. The hybrid power generation system of claim 4, wherein each of the one or more first conversion units comprises one or more second AC to DC converters.

12. The hybrid power generation system of claim 1, wherein each of the one or more first conversion units, the one or more second conversion units, and the one or more second power generation subsystems comprise one or more silicon carbide (SiC) switches.

13. The hybrid power generation system of claim 1, wherein the one or more second power generation subsystems comprise a DC to DC converter.

14. A power system comprising:
an electrical grid;
a wind based power generation subsystem coupled to the electrical grid, wherein the wind based power generation subsystem is coupled to a ground terminal and comprises:
a wind driven doubly fed induction generator comprising a rotor and a stator; one or more first conversion units coupled to the rotor,
a first direct current (DC) link;
a plurality of second conversion units directly coupled to a corresponding one or more first conversion units via the first DC link;
one or more DC source based power generation subsystems coupled to the wind based power generation subsystem via the first DC link, wherein each of the plurality of second conversion units correspond to separate alternating current phases;
a first transformer, wherein at least the stator and the one or more second conversion units are coupled to the first transformer;
a plurality of power conversion subunits comprising a plurality of first bridge circuits coupled to a corresponding one or more second bridge circuits via one or more corresponding transformers, wherein at least one of the one or more DC source based power generation subsystems and the wind based power generation subsystem comprises the one or more power conversion subunits, and, wherein the one or more power conversion subunits are configured to galvanically isolate the one or more DC source based power generation subsystems from the wind based power generation subsystem; and
wherein each of the plurality of second conversion units comprises a plurality of the power conversion subunits and the plurality of first bridge circuits are connected in parallel on a DC side of the plurality of second conversion units.

15. The hybrid power generation system of claim 1, wherein the one or more first conversion units are configured to operate in at least one of an interleaved mode of operation and a non-interleaved mode of operation.

16. The hybrid power generation system of claim 1, wherein the one or more first conversion units are coupled to at least one of a rotor bus and a neutral terminal via corresponding inductors.

* * * * *